United States Patent
Bishop

(10) Patent No.: US 11,794,435 B2
(45) Date of Patent: Oct. 24, 2023

(54) ALUMINUM DUST COLLECTION AND COMPACTING METHOD

(71) Applicant: Ford Motor Company, Dearborn, MI (US)

(72) Inventor: Frank Bishop, Wales, MI (US)

(73) Assignee: Ford Motor Company, Dearborn, MI (US)

( * ) Notice: Subject to any disclaimer, the term of this patent is extended or adjusted under 35 U.S.C. 154(b) by 1275 days.

(21) Appl. No.: 16/288,315

(22) Filed: Feb. 28, 2019

(65) Prior Publication Data
US 2019/0255794 A1 Aug. 22, 2019

Related U.S. Application Data

(63) Continuation of application No. 15/477,480, filed on Apr. 3, 2017, now Pat. No. 10,259,184.

(51) Int. Cl.
| | |
|---|---|
| *B30B 9/32* | (2006.01) |
| *B24B 55/06* | (2006.01) |
| *B23Q 11/00* | (2006.01) |
| *B23K 26/16* | (2006.01) |
| *B23K 26/00* | (2014.01) |
| *B23K 26/142* | (2014.01) |

(Continued)

(52) U.S. Cl.
CPC ........... *B30B 9/327* (2013.01); *B03B 9/061* (2013.01); *B04C 11/00* (2013.01); *B07B 9/00* (2013.01); *B23K 26/0093* (2013.01); *B23K 26/142* (2015.10); *B23K 26/16* (2013.01); *B23Q 11/005* (2013.01); *B23Q 11/0046* (2013.01); *B23Q 11/0057* (2013.01); *B24B 55/06* (2013.01); *B30B 11/00* (2013.01); *B65G 53/06* (2013.01); *B65G 53/24* (2013.01); *C22B 1/2406* (2013.01); *C22B 1/248* (2013.01); *B65G 53/10* (2013.01); *B65G 53/46* (2013.01); *B65G 53/4691* (2013.01); *Y10S 29/031* (2013.01); *Y10S 29/094* (2013.01); *Y10S 82/901* (2013.01); *Y10S 100/903* (2013.01); *Y10T 29/49753* (2015.01); *Y10T 408/50* (2015.01); *Y10T 409/304088* (2015.01)

(58) Field of Classification Search
None
See application file for complete search history.

(56) References Cited

U.S. PATENT DOCUMENTS

| | | | |
|---|---|---|---|
| 6,206,247 B1 * | 3/2001 | Ingram | B65G 53/4633 222/368 |
| 2001/0035510 A1 * | 11/2001 | Oh | F16K 37/0041 251/129.03 |

FOREIGN PATENT DOCUMENTS

| | | | | |
|---|---|---|---|---|
| DE | 19921485 A1 * | 11/2000 | | B03B 9/061 |
| JP | 11226839 A * | 8/1999 | | B30B 9/327 |

OTHER PUBLICATIONS

Yonekawa, JP 11-226839, English Translation (Year: 1999).*

(Continued)

*Primary Examiner* — Colin W. Slifka
(74) *Attorney, Agent, or Firm* — Burris Law, PLLC

(57) ABSTRACT

A method of forming a compact includes removing material from a workpiece, transferring metallic dust released during the material removal into a conduit, operating a plurality of slide gates to selectively control movement of the dust from the conduit to either one of a primary collector and a back-up collector, drawing the dust through the conduit to a compactor, and compacting the dust in the compactor.

20 Claims, 4 Drawing Sheets

(51) Int. Cl.

| | |
|---|---|
| *B30B 11/00* | (2006.01) |
| *B65G 53/24* | (2006.01) |
| *B65G 53/60* | (2006.01) |
| *B03B 9/06* | (2006.01) |
| *C22B 1/24* | (2006.01) |
| *C22B 1/248* | (2006.01) |
| *B04C 11/00* | (2006.01) |
| *B07B 9/00* | (2006.01) |
| *B65G 53/10* | (2006.01) |
| *B65G 53/46* | (2006.01) |
| *B65G 53/06* | (2006.01) |

(56) References Cited

OTHER PUBLICATIONS

Baur et al., DE 19921485, English Translation (Year: 2000).*
Grandaw, "NFPA requirements for using an isolation flap valve on your dust collection system," PBE, published Oct. 2015, 3 pages (Year: 2015).*
Meyer Catalog 269-C-006, "Rotary Airlock Valves," pp. 1-27, uploaded to www.meyerindustrial.com Nov. 2015 (Year: 2015).*
Non-Final Office Action for U.S. Appl. No. 15/477,480, dated Sep. 4, 2018 (Year: 2018).*

\* cited by examiner

ALUMINUM DUST COLLECTION AND COMPACTING METHOD

CROSS-REFERENCE

This application is a continuation of U.S. application Ser. No. 15/477,480, now U.S. Pat. No. 10,259,184, filed on Apr. 3, 2017. The disclosure of the above application is incorporated herein by reference.

FIELD

The present disclosure relates generally to a dust collection apparatus and method, and more particularly to a dust collection method used with a machining apparatus for collecting metallic dust generated during operation of the machining apparatus.

BACKGROUND

The statements in this section merely provide background information related to the present disclosure and may not constitute prior art.

A machining apparatus for machining metallic materials, such as cutting, drilling, milling, grinding, blasting, and turning, can generate a significant amount of metallic dust. A dust collection apparatus is generally attached to the machining apparatus to collect the metallic dust in order to reduce air pollution at the worksite. The dust collection apparatus may include a container and one or more dust collection bins. The dust is guided and collected in the one or more dust collection bins through the container of the dust collection apparatus.

The dust collection bins are routinely transported and emptied to a larger drum container outside a manufacturing plant for disposal. When the dust collection bins are not emptied in time, the dust may build up in the container and become air-borne. Air-borne metallic dust can create a potential explosive hazard. More specifically, combustible materials can burn quite rapidly when in a smaller/fine form, such as dust. Materials that can oxidize, such as magnesium, can cause an explosion when in the form of smaller particles/dust. Other materials such as aluminum can form a suspension in air, which can then lead to an explosion.

When the metallic dust contained in the dust collection bins is exposed to air, a potential explosive hazard exists. Further, the routine handling and transporting of the dust collection bins from the worksite to the larger drum container outside the manufacturing plant creates a potential health and safety issue.

These dust-related issues, among other issues from manufacturing processes that create metallic dust, are addressed by the present disclosure.

SUMMARY

In one form, a method of forming a compact includes removing material from a workpiece, transferring metallic dust released during the material removal into a conduit, operating a plurality of slide gates to selectively control movement of the dust from the conduit to either one of a primary collector and a back-up collector, drawing the dust through the conduit to a compactor, and compacting the dust in the compactor. In a variety of alternate forms of the present disclosure: the method further includes operating a rotary valve to move the metallic dust into the conduit; the method further includes collecting the dust in an initial collection unit upstream of the rotary valve, wherein the rotary valve moves the metallic dust from the initial collection unit to the conduit; the method further includes collecting the dust in an initial collection unit upstream of the conduit, wherein the metallic dust is transferred to the conduit from the initial collection unit; the compactor is downstream of the primary collector; the step of removing material from the workpiece includes removing material from the workpiece via a laser; the metallic dust is aluminum dust; the compactor compacts the dust into cylindrical pucks; the dust is drawn through the conduit via a blower configured to pull air downstream to carry the dust into the compactor; at least one rotary air lock is operatively connected to a downstream end portion of at least one of the primary collector and the back-up collector; the primary collector is a cyclone dust collection device; at least one of the slide gates is air operated and operatively connected to at least one of the primary collector and the back-up collector; a Y conduit connects a blower to the primary collector and the back-up collector; an explosion isolation valve is disposed along the conduit and upstream from the compactor.

In another form, a method of forming a compact includes removing material from a workpiece, collecting metallic dust released during the material removal in a first collector, operating a rotary valve to move the dust from the first collector to a conduit, operating slide gates to selectively control movement of the dust from the conduit to either a second collector or a back-up collector, drawing the dust through the conduit to a compactor, and compacting the dust. In a variety of alternate forms of the present disclosure: the compactor is downstream of the primary collector; the step of removing material from the workpiece includes removing material from the workpiece via a laser; the compactor compacts the dust into cylindrical pucks; the dust is drawn through the conduit via a blower configured to pull air downstream to carry the dust into the compactor; the dust is aluminum dust.

In one form, an apparatus for collecting dust from a cutting unit is provided. The apparatus includes a rotary valve operatively connected to the cutting unit, a conduit in fluid communication with the rotary valve, and a compacting machine disposed downstream from the conduit and configured to receive dust from the conduit. A blower is configured to pull air downstream to carry the dust into the compacting machine. The compacting machine produces a compact from the dust.

In other forms, the apparatus may further include a primary dust collection unit disposed downstream from the conduit and upstream from the compacting machine and a rotary air lock operatively connected to a downstream end portion of the dust collection unit. A blower is also be provided in one form of the present disclosure, which is operatively connected to the dust collection unit. Further, at least one slide gate may be operatively connected to the dust collection unit.

In still another form, a back-up dust collection unit may be disposed adjacent the primary dust collection unit and a rotary air lock operatively connected to a downstream end portion of the back-up dust collection unit. A blower may be operatively connected to the back-up dust collection unit, and at least one slide gate may be provided that is operatively connected to the back-up dust collection unit.

In still another form, an explosion isolation valve may also be provided and disposed along the conduit and upstream from the compacting machine. In one form, the compacting machine is a briquetter. A manual drum vacuum line may be operatively connected to the conduit upstream from the compacting machine.

In another form, an apparatus for collecting aluminum dust from a cutting unit is provided. The apparatus includes a rotary valve operatively connected to the cutting unit, a conduit in fluid communication with the rotary valve, a compacting machine, and an explosion isolation valve. The compacting machine is disposed downstream from the conduit and configured to receive aluminum dust from the conduit and to produce an aluminum compact. The explosion isolation valve is disposed along the conduit and upstream from the compacting machine.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
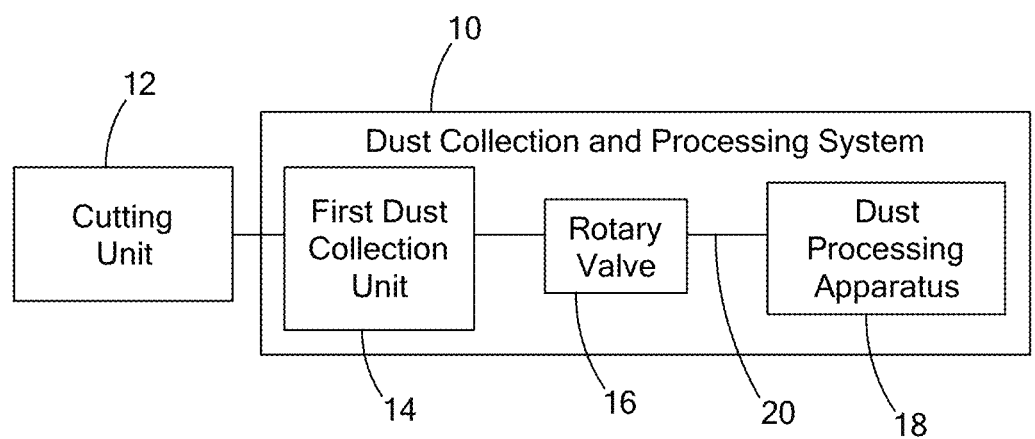
FIG. 1 is a schematic view of a dust collection and processing system used with a cutting unit and constructed in accordance with teachings of the present disclosure.

Referring to FIG. 1, a dust collection and processing system 10 constructed in accordance with the teachings of the present disclosure is used with a cutting unit 12 for collecting and processing metallic wastes, particularly metallic dusts, generated during operation of the cutting unit 12. The cutting unit 12 may be any processing, machining, or cutting unit such as a laser cutting system, a drilling unit, a milling unit, a grinding unit, a blasting unit, a turning unit, or any unit that generates metallic dust during operation. In one application, the cutting unit 12 is a laser cutting unit for cutting aluminum pipes formed by a hydro-forming process, and the metallic dust is aluminum dust.

The dust collection and processing system 10 generally includes a dust collection unit 14, a rotary valve 16, and a dust processing apparatus 18. The dust collection unit 14 is operatively connected to the cutting unit 12 to collect the metallic dust generated during operation of the cutting unit 12. The rotary valve 16 is disposed adjacent to and operatively connected to the dust collection unit 14 to continuously transport the dust collected by the dust collection unit 14 to the dust processing apparatus 18. A conduit 20 is provided between and is in fluid communication with the rotary valve 16 and the dust processing apparatus 18 for transporting dust collected by the dust collection unit 14 to the dust processing apparatus 18. While the dust collection unit 14 is shown to be a part of the dust collection and processing system 10, the dust collection unit 14 may be a separate unit from the dust collection and processing system 10. For example, the cutting unit 12 and the dust collection unit 14 may be disposed inside a manufacturing plant/building, whereas the dust processing apparatus 18 may be disposed in an enclosed structure located outside the manufacturing plant/building.

Figure 2:
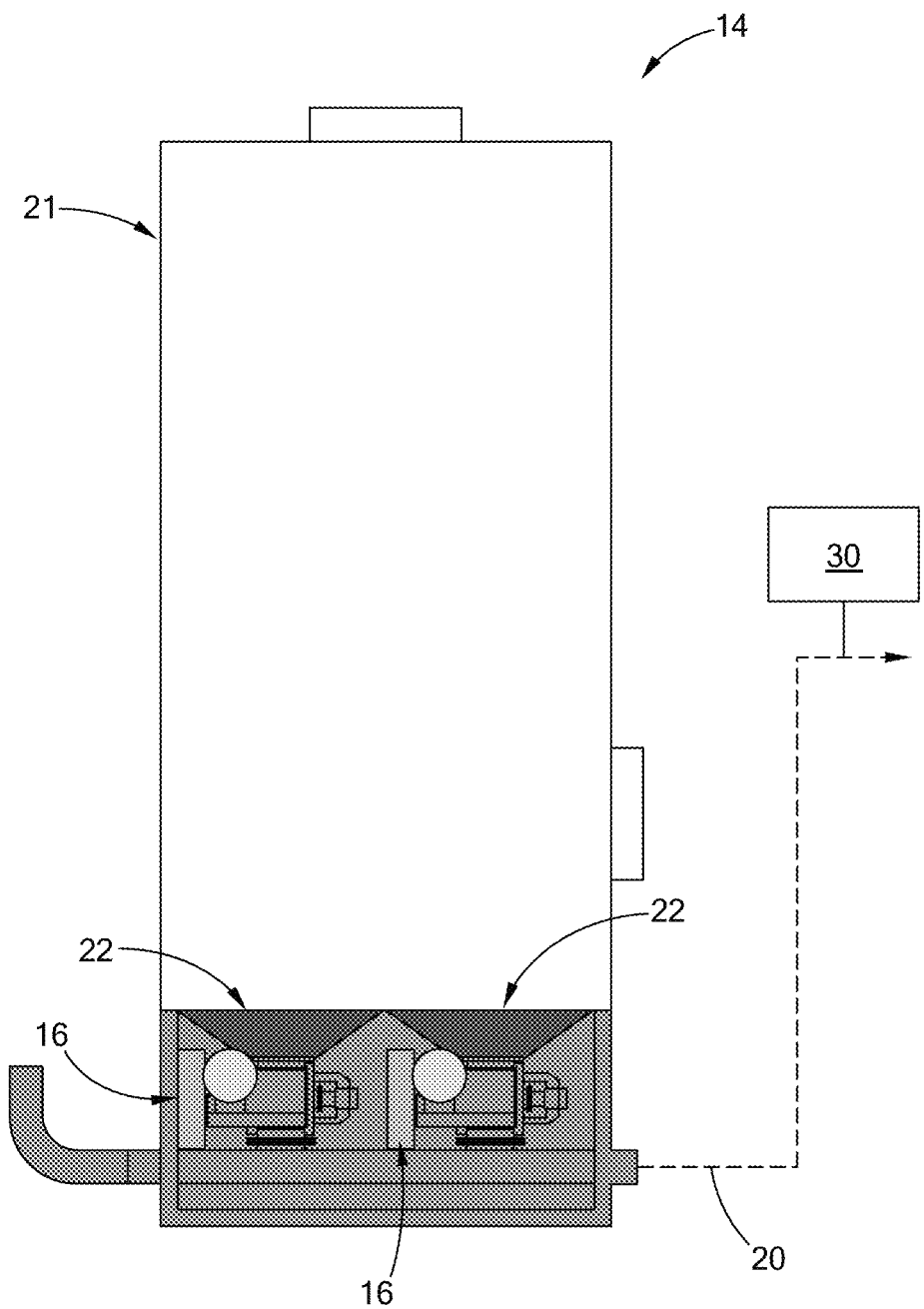
FIG. 2 is a schematic view of a dust collection unit and a rotary valve of the dust collection and processing system of FIG. 1.

Referring to FIG. 2, the dust collection unit 14 includes a housing 21 for receiving metallic dust, and one or more hoppers 22 disposed at a lower end of the housing 21. The rotary valves 16 are disposed at an end of the hoppers 22. The dust received inside the housing 21 is guided through the hoppers 22 and the rotary valves 16 to the conduit 20. High velocity air flow from a blower 30 is directed from the conduit 20 to pull the dust from the rotary valves 16 to the dust processing apparatus 18, which is described in greater detail below.

Figure 3:
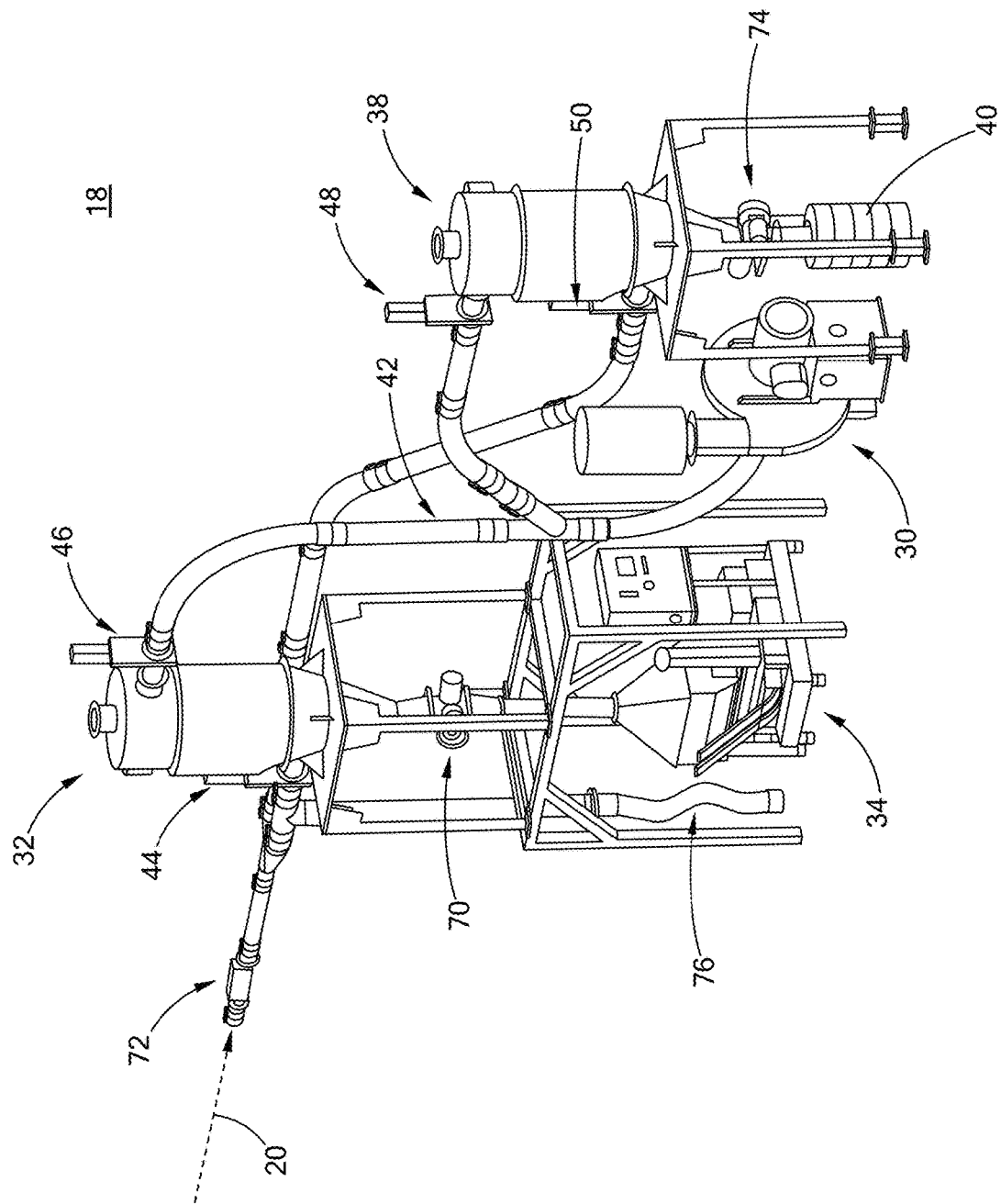
FIG. 3 is a schematic view of a dust processing apparatus of the dust collection and processing system of FIG. 1.

Referring to FIG. 3, the dust processing apparatus 18 is disposed downstream from the conduit 20 for processing and compacting the dust transported from the conduit 20. The dust processing apparatus 18 includes the blower 30, a primary dust collection unit 32, a compacting machine 34, and a backup dust collection unit 38.

The blower 30 is disposed downstream from both the primary dust collection unit 32 and the dust collection unit 14 to pull the dust from the dust collection unit 14 to the primary dust collection unit 32. In one form, the primary dust collection unit 32 may be a cyclone machine to separate dust from air and guide the dust to the compacting machine 34 disposed downstream from the primary dust collection unit 32. Similarly, the back-up dust collection unit 38 may also be a cyclone machine and further include a relatively large drum container 40, which can be removed for disposition of the dust collected therein. In another form, the compacting machine 34 may be operatively connected to the back-up dust collection unit 38 through the use of a manual drum vacuum line 76 as described in greater detail below.

The blower 30 is downstream from and is operatively connected to the primary dust collection unit 32 and the back-up dust collection unit 38 for selectively pulling or moving the dust either to the primary dust collection unit 32, or to the back-up collection unit 38. More specifically, a "Y" conduit 42 is connected between the blower 30, the primary dust collection unit 32, and the back-up dust collection unit 38 as shown. The blower 30 operates to selectively move the dust to either the primary dust collection unit 32 or the back-up dust collection unit 38 by way of slide gates 44, 46, 48, and 50, which are operated in one form by shop air, or external air pressure, and are controlled by a computer (not shown). In one form of the present disclosure, there are four (4) slide gates, one at an inlet and outlet of each of the primary dust collection unit 38 and the back-up dust collection unit 38.

Slide gates 44 and 46 are normally open when dust is being collected into the primary dust collection unit 32, while slide gates 48 and 50 are closed. When a bypass of dust from the primary dust collection unit 32 to the back-up collection unit 38 is desired, slide gates 44 and 46 close, and slide gates 48 and 50 open, thus providing for a flow of air and the collection of dust into the back-up collection unit 38.

Figure 4:
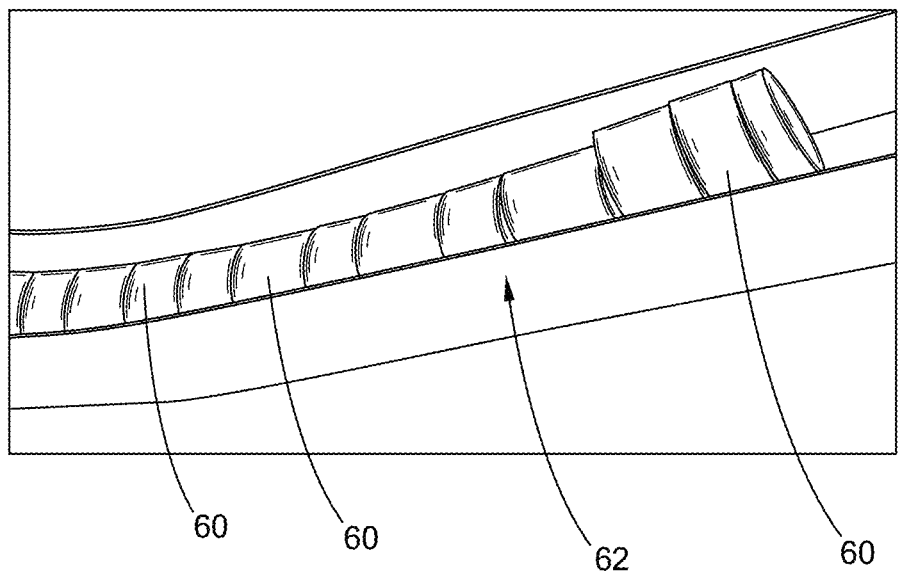
FIG. 4 is a schematic view of a plurality of dust compacts generated by a compacting machine of the dust collection and processing system of FIG. 1.

Referring now to FIG. 4, the compacting machine 34 may be a briquetter for compacting the collected dust into a plurality of compacts 60, such as aluminum compacts. The compacts 60 in one form may have a cylindrical shape, such as a puck, and weigh approximately 1 pound each. The compacting machine 34 may include a conveyor belt or channel 62 for continuously guiding and delivering the compacts 60 to an adjacent collection site or container (not shown). The compacts 60 can be relatively easily transported and handled for further processing or disposal, thereby reducing air pollution and mitigating health/safety concerns in handling and processing dust from the cutting unit 12.

Referring back to FIG. 3, the dust processing apparatus 18 further includes a number of additional components. For example, a first rotary air lock 70 is operatively connected to a downstream end portion of the primary dust collection unit 32, an explosion isolation valve 72 is disposed along the conduit 20 and upstream from the primary dust collection unit 32, a second rotary air lock 74 is operatively connected to a downstream end portion of the back-up dust collection unit 38, and a manual drum vacuum line 76 is connected to a downstream portion of the primary dust collection unit 32.

The first rotary air lock 70 is disposed between the primary dust collection unit 32 and the compacting machine 34 for controlling delivery of the dust out of the primary dust collection unit 32 to the compacting machine 34. Similarly, the second rotary air lock 74 controls delivery of the dust out of the back-up dust collection unit 38.

The explosion isolation valve 72 functions as a safety device and controls/isolates fluid communication, or the flow of dust, between the dust processing apparatus 18 and the dust collection unit 14. Should an explosion-caused fire occur inside the second collection unit 32 and/or the back-up dust collection unit 38, the fire and associated heat can be blocked by the explosion isolation valve 72. Therefore, the fire and associated heat will not be transferred back inside the building and to the dust collection unit 14. The explosion isolation valve 72 is also operable to block fire and associated heat in the opposite direction, namely, if there were to be an explosion-caused fire inside the dust collection unit 14. In this latter case, the explosion isolation valve 72 would inhibit fire and associated heat from traveling to the dust processing apparatus 18 from the dust collection unit 14.

As further shown, the manual drum vacuum line 76 is operatively connected to the conduit 20 at a location upstream from the primary dust collection unit 32. This manual drum vacuum line 76 is operatively connected to the back-up dust collection unit 38 and to the compacting machine 34 when the dust is diverted from the primary dust collection unit 32.

With the dust collection and processing system 10 of the present disclosure, the dust generated by the cutting unit 12 is collected in the dust collection unit 14 and continuously transported to the dust processing apparatus 18 for further processing into a plurality of dust compacts 60. The dust is less likely to be built up inside the housing 21 of the dust collection unit 14 to become air-borne, thereby reducing any explosive hazards.

Moreover, the dust collected in the dust collection unit 14 can be continuously transported to the primary dust collection unit 32 and/or the back-up collection unit 38, as opposed to smaller dust collection bins in the prior art dust collector. Since the primary dust collection unit 32 and the back-up dust collection unit 38 are enclosed structures and can be relatively easily handled and transported for further disposal, health and safety issues with handling dust can be mitigated.

It should be noted that the disclosure is not limited to the various forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of forming a compact comprising:
removing material from a workpiece;
transferring metallic dust released during the material removal into a conduit;
operating a plurality of slide gates to selectively control movement of the dust from the conduit to either one of a primary collector and a back-up collector;
drawing the dust through the conduit to a compactor; and
compacting the dust in the compactor.

2. The method according to claim 1, further comprising operating a rotary valve to move the metallic dust into the conduit.

3. The method according to claim 2, further comprising collecting the dust in an initial collection unit upstream of the rotary valve, wherein the rotary valve moves the metallic dust from the initial collection unit to the conduit.

4. The method according to claim 1, further comprising collecting the dust in an initial collection unit upstream of the conduit, wherein the metallic dust is transferred to the conduit from the initial collection unit.

5. The method according to claim 1, wherein the compactor is downstream of the primary collector.

6. The method according to claim 1, wherein the step of removing material from the workpiece includes removing material from the workpiece via a laser.

7. The method according to claim 1, wherein the metallic dust is aluminum dust.

8. The method according to claim 1, wherein the compactor compacts the dust into cylindrical pucks.

9. The method according to claim 1, wherein the dust is drawn through the conduit via a blower configured to pull air downstream to carry the dust into the compactor.

10. The method according to claim 1, wherein at least one rotary air lock is operatively connected to a downstream end portion of at least one of the primary collector and the back-up collector.

11. The method according to claim 1, wherein the primary collector is a cyclone dust collection device.

12. The method according to claim 1, wherein at least one of the slide gates is air operated and operatively connected to at least one of the primary collector and the back-up collector.

13. The method according to claim 1, wherein a Y conduit connects a blower to the primary collector and the back-up collector.

14. The method according to claim 1, wherein an explosion isolation valve is disposed along the conduit and upstream from the compactor.

15. A method of forming a compact comprising:
removing material from a workpiece;
collecting metallic dust released during the material removal in a first collector;
operating a rotary valve to move the dust from the first collector to a conduit;
operating slide gates to selectively control movement of the dust from the conduit to either a second collector or a back-up collector;
drawing the dust through the conduit to a compactor; and
compacting the dust.

16. The method according to claim 15, wherein the compactor is downstream of the primary collector.

17. The method according to claim 15, wherein the step of removing material from the workpiece includes removing material from the workpiece via a laser.

18. The method according to claim 15, wherein the compactor compacts the dust into cylindrical pucks.

19. The method according to claim 15, wherein the dust is drawn through the conduit via a blower configured to pull air downstream to carry the dust into the compactor.

20. The method according to claim 15, wherein the dust is aluminum dust.

* * * * *